United States Patent
Ibe et al.

(10) Patent No.: US 11,900,213 B2
(45) Date of Patent: Feb. 13, 2024

(54) QUANTUM INFORMATION PROCESSING METHOD FOR COMPUTING TRANSITION AMPLITUDE, CLASSICAL COMPUTER, QUANTUM COMPUTER, AND HYBRID SYSTEM

(71) Applicant: QUNASYS INC., Tokyo (JP)

(72) Inventors: Yohei Ibe, Tokyo (JP); Yuya Nakagawa, Tokyo (JP); Takahiro Yamamoto, Tokyo (JP); Kosuke Mitarai, Tokyo (JP)

(73) Assignee: QUNASYS INC., Tokyo (JP)

( * ) Notice: Subject to any disclaimer, the term of this patent is extended or adjusted under 35 U.S.C. 154(b) by 389 days.

(21) Appl. No.: 17/392,677

(22) Filed: Aug. 3, 2021

(65) Prior Publication Data

US 2022/0044141 A1 Feb. 10, 2022

(30) Foreign Application Priority Data

Aug. 4, 2020 (JP) .................. 2020-132647

(51) Int. Cl.
  *G06F 1/06* (2006.01)
  *G06N 10/00* (2022.01)
  *G06F 15/16* (2006.01)
(52) U.S. Cl.
  CPC ............. *G06N 10/00* (2019.01); *G06F 15/16* (2013.01)

(58) Field of Classification Search
  USPC .................................................. 716/100, 101
  See application file for complete search history.

(56) References Cited

U.S. PATENT DOCUMENTS 6,678,450 B1 * 1/2004 Franson ................ G06N 10/00
  359/326
11,514,209 B1 * 11/2022 Fernandes Ramos . G06N 10/80
(Continued)

OTHER PUBLICATIONS

A. Peruzzo et al., "A Variational Eigenvalue Solver on a Photonic Quantum Processor", Nature Communications, 5, article No. 4213, pp. 1-7, Jul. 2014.
(Continued)

*Primary Examiner* — Brian Ngo
(74) *Attorney, Agent, or Firm* — Brooks Kushman P.C.

(57) ABSTRACT

A quantum computer executes quantum measurement of $<\psi_1|P_i|\psi_2>$, $<\psi_1|U_{ij,+}|\psi_2>$, $<\psi_1|U_{ij,-}|\psi_2>$, $<\psi_1|P_j|\psi_2>$, and $<\psi_1|P_iP_j|\psi_2<$ below based on a quantum state pair configured by a first quantum state $\psi_1$ and a second quantum state $\psi_2$, and outputs measurement results of the quantum measurement. A classical computer computes a transition amplitude $|<\psi_1|A|\psi_2>|^2$ based on measurement results for $<\psi_1|P_i|\psi_2>$, $<\psi_1|U_{ij,+}|\psi_2>$, $<\psi_1|U_{ij,-}|\psi_2>$, $<\psi_1|P_j|\psi_2>$, and $<\psi_1|P_iP_j|\psi_2>$, wherein A is a physical quantity for computation of transition amplitude, i and j are indices for identifying a and P, a is a real number, P is a tensor product of a Pauli matrix, U is a unitary gate, and $<\psi_1|\psi_2>=0$.

10 Claims, 8 Drawing Sheets

(56) References Cited

U.S. PATENT DOCUMENTS

2012/0075682 A1* 3/2012 Amoroso ............... G06N 10/00
                                                        977/933
2018/0165601 A1* 6/2018 Wiebe .................... G06F 17/11
2020/0192417 A1* 6/2020 Fernandes Ramos .... H03L 7/08

OTHER PUBLICATIONS

Ken M Nakanishi et al., "Subspace-Search Variational Quantum Eigensolver for Excited States", Phys. Rev. Research 1, 033062, 1-7, Oct. 30, 2019.
Robert M. Parrish et al.,"Quantum Computation of Electronic Transitions using a Variational Quantum Eigensolver", Phys. Rev. Lett. 122, 230401, 1-6, Jun. 12, 2019.
O. Higgott et al., "Variational Quantum Computation of Excited States", Quantum, 3, 156, pp. 1-11, Jul. 1, 2019.
H. Buhrman et al., "Quantum Fingerprinting", Phys. Rev. Lett., vol. 87, No. 16, 167902 1-4, Sep. 26, 2001.

* cited by examiner

FIG.6
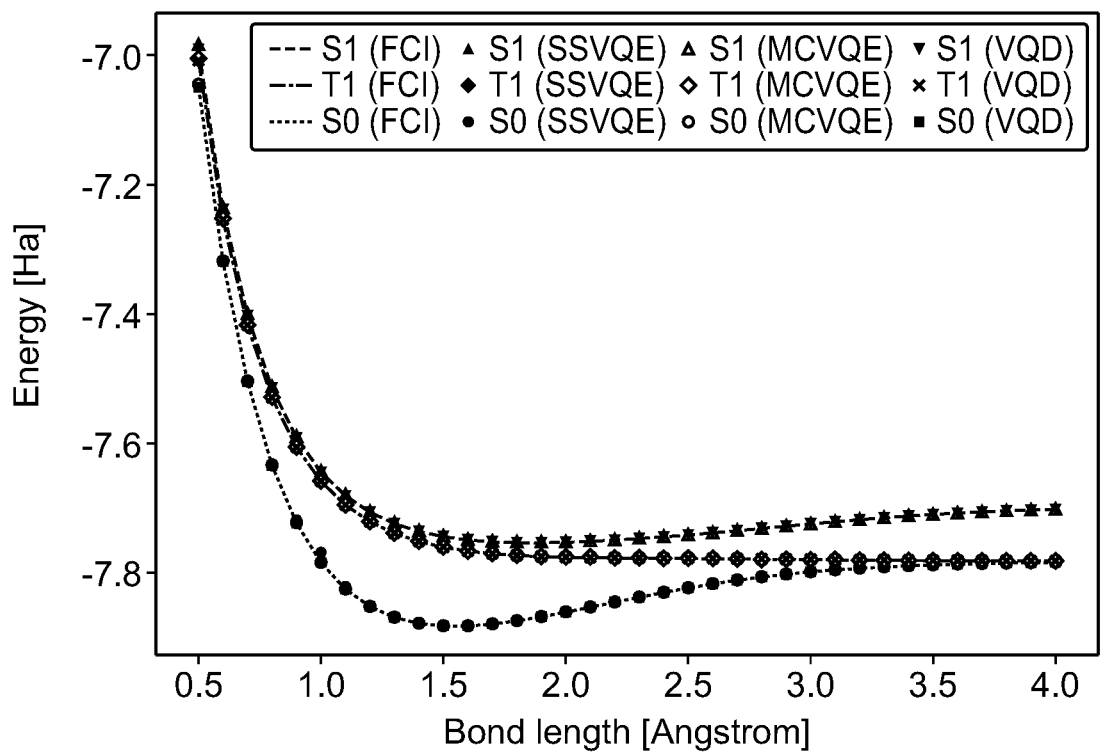
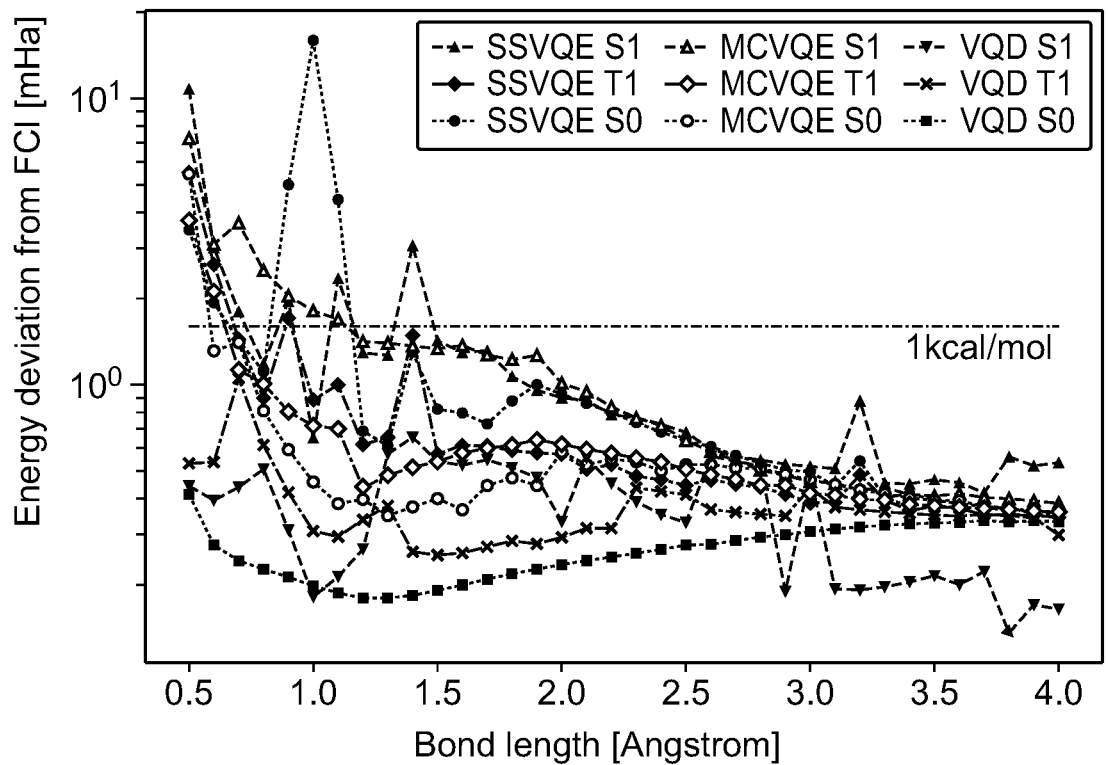

QUANTUM INFORMATION PROCESSING METHOD FOR COMPUTING TRANSITION AMPLITUDE, CLASSICAL COMPUTER, QUANTUM COMPUTER, AND HYBRID SYSTEM

CROSS-REFERENCE TO RELATED APPLICATIONS

This application claims the benefit of Japanese Patent Application No. 2020-132647 filed Aug. 4, 2020, the disclosure of which is hereby incorporated in its entirety by reference herein.

TECHNICAL FIELD

Technology disclosed herein relates to a quantum information processing method for computing transition amplitude, a classical computer, a quantum computer, a hybrid system, and a quantum information processing program.

BACKGROUND

Variational Quantum Eigensolvers (VQE) are already known (see for example Document 1: "A Variational Eigenvalue Solver on a Photonic Quantum Processor" by A. Peruzzo, J. McClean, P. Shadbolt, M-H. Yung, X-Q. Zhou, P. J. Love, A. Aspuru-Guzik and J. L. O'Brien in Nature Communications, 5, article number 4213, 2014). A VQE sequentially updates parameters of a quantum circuit in order to compute an approximation of a smallest eigenvalue of a Hamiltonian.

There are also computation methods that expand on VQEs, such as Subspace-Search Variational Quantum Eigensolvers (SSVQE; see for example Document 2: "Subspace-Search Variational Quantum Eigensolver For Excited States" by Ken M Nakanishi, Kosuke Mitarai, and Keisuke Fujii in Phys. Rev. Research 1, 033062, published Oct. 30, 2019), Multistate-Contracted Variational Quantum Eigensolvers (MCVQE; see for example Document 3: "Quantum Computation of Electronic Transitions using a Variational Quantum Eigensolver" by Robert M. Parrish, Edward G. Hohenstein, Peter L. McMahon, and Todd J. Martinez in Phys. Rev. Lett. 122, 230401, published Jun. 12, 2019), and Variational Quantum Deflation (VQD; see for example Document 4: "Variational Quantum Computation of Excited States" by O. Higgott, D. Wang, and S. Brierley in Quantum 3, 156, 2019).

RELATED NON PATENT DOCUMENT

Non-Patent Document 1: "A Variational Eigenvalue Solver on a Photonic Quantum Processor" by A. Peruzzo, J. McClean, P. Shadbolt, M-H. Yung, X-Q. Zhou, P. J. Love, A. Aspuru-Guzik and J. L. O'Brien in Nature Communications, 5, article number 4213, 2014

Non-Patent Document 2: "Subspace-Search Variational Quantum Eigensolver For Excited States" by Ken M Nakanishi, Kosuke Mitarai, and Keisuke Fujii in Phys. Rev. Research 1, 033062, published Oct. 30, 2019

Non-Patent Document 3: "Quantum Computation of Electronic Transitions using a Variational Quantum Eigensolver" by Robert M. Parrish, Edward G. Hohenstein, Peter L. McMahon, and Todd J. Martinez in Phys. Rev. Lett. 122, 230401, published Jun. 12, 2019

Non-Patent Document 4: "Variational Quantum Computation of Excited States" by O. Higgott, D. Wang, and S. Brierley in Quantum 3, 156, 2019

SUMMARY

A first aspect of the present disclosure is a quantum information processing method for computing a transition amplitude by processing executed on a hybrid system including a classical computer and a quantum computer. The processing includes the quantum computer executing quantum measurement based on a quantum state pair configured by a first quantum state $\psi_1$ and a second quantum state $\psi_2$ so as to measure $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ in Equation (1) below, and outputting measurement results from the quantum measurement. The processing also includes the classical computer computing a transition amplitude $|\langle\psi_1|A|\psi_2\rangle|^2$ according to Equation (1) below, based on the measurement results for $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$.

$$|\langle\psi_1|A|\psi_2\rangle|^2 = \sum_i a_i^2 |\langle\psi_1|P_i|\psi_2\rangle|^2 + \sum_{i<j} a_i a_j \big[2|\langle\psi_1|U_{ij,+}|\psi_2\rangle|^2 + 2|\langle\psi_1|U_{ij,-}|\psi_2\rangle|^2 - |\langle\psi_1|P_i|\psi_2\rangle|^2 - |\langle\psi_1|P_j|\psi_2\rangle|^2 - |\langle\psi_2|P_iP_j|\psi_2\rangle|^2\big] \quad \text{Equation (1)}$$

Wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 6 is a diagram illustrating simulation results obtained by an Example.

DETAILED DESCRIPTION

Detailed explanation follows regarding an exemplary embodiment of technology disclosed herein, with reference to the drawings.

Hybrid System 100 according to Exemplary Embodiment

Figure 1:
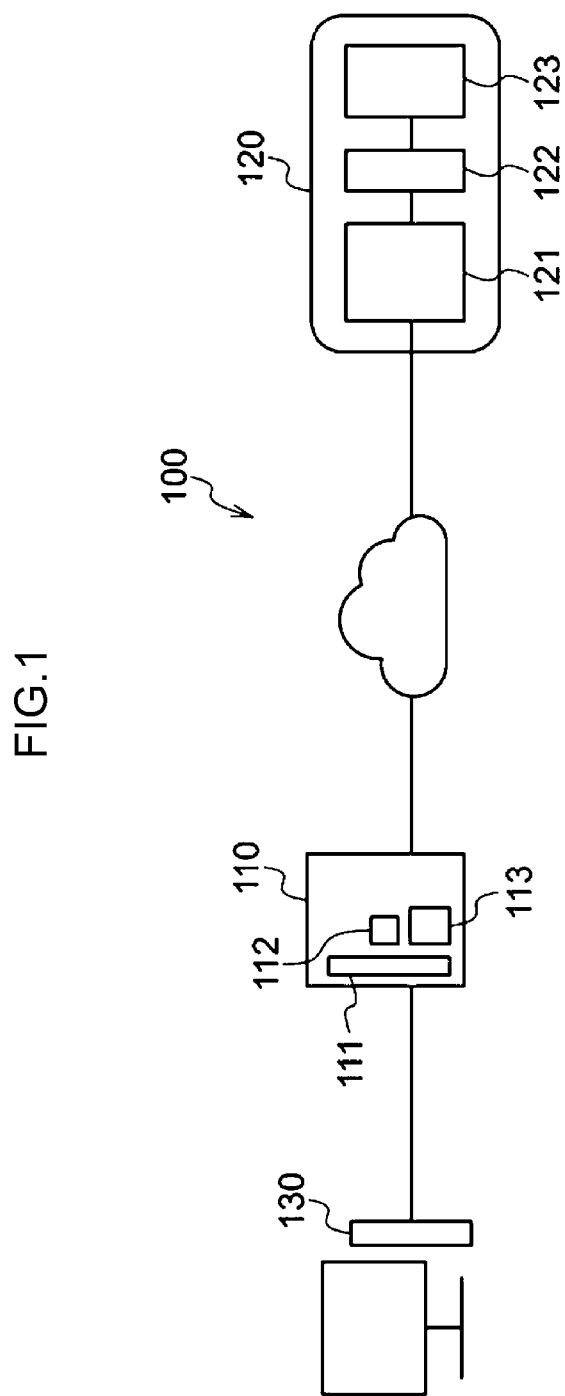
FIG. 1 is a diagram illustrating an example of a schematic configuration of a hybrid system 100 of an exemplary embodiment.

FIG. 1 illustrates a hybrid system 100 according to an exemplary embodiment. The hybrid system 100 of the present exemplary embodiment includes a classical computer 110, a quantum computer 120, and a user terminal 130. As illustrated in FIG. 1, the classical computer 110, the quantum computer 120, and the user terminal 130 are connected together, for example, over a computer network such as an IP (internet protocol) network.

In the hybrid system 100 of the present exemplary embodiment, the quantum computer 120 performs prescribed quantum computations in response to requests from the classical computer 110, and then outputs the computation results of such quantum computations to the classical computer 110. The classical computer 110 then outputs the computation results for the quantum computations to the user terminal 130. Prescribed computation processing is accordingly executed by the hybrid system 100 as a whole.

The classical computer 110 includes a communication section 111 such as a communication interface, a processing section 112 such as a processor, a central processing unit (CPU), or the like, and an information storage section 113 including a storage device such as memory or a hard disk, or a storage medium. The classical computer 110 is configured to execute programs to perform various processing. The classical computer 110 may include one or plural devices or servers. The program may be one program, or may include plural programs, and may be configured as a non-transitory program product recorded on a computer-readable storage medium.

As an example, based on information transmitted from the classical computer 110, the quantum computer 120 generates an electromagnetic wave for irradiating at least one qubit out of a cluster of qubits 123. The quantum computer 120 then executes the quantum circuit by irradiating at least one qubit out of the qubit cluster 123 with the generated electromagnetic wave.

In the example illustrated in FIG. 1, the quantum computer 120 includes a control device 121 to perform communication with the classical computer 110, an electromagnetic wave generation device 122 to generate electromagnetic waves in response to requests from the control device 121, and the qubit cluster 123 subjected to irradiation of electromagnetic waves from the electromagnetic wave generation device 122. The electromagnetic wave generation device 122 and the qubit cluster 123 of the quantum computer 120 also configure a quantum processing unit (QPU). The QPU is an example of a quantum processor. Note that in the present exemplary embodiment, the "quantum computer" refers to a computer that performs at least some computation with qubits, rather than denoting a computer that does not perform any computation using classical bits at all.

The control device 121 is a classical computer that performs computation using classical bits, and may also perform some or all of the processing that is described in the present specification as being performed by the classical computer 110, on behalf thereof. For example, the control device 121 may include a quantum circuit stored or determined in advance, or in response to receipt of parameters for a quantum circuit may generate quantum gate information to execute the quantum circuit in the qubit cluster 123.

The user terminal 130 is a classical computer that performs computation using classical bits. The user terminal 130 receives information input by a user, and executes processing in response to this information.

Figure 2:
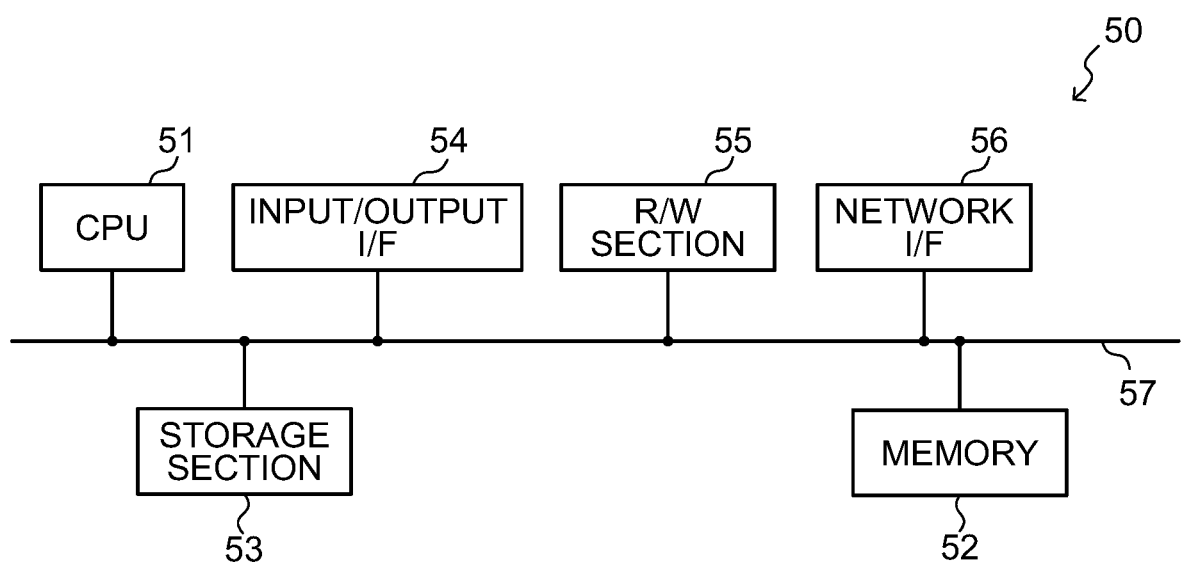
FIG. 2 is a schematic block diagram illustrating a computer configured to function as a classical computer 110, a control device 121, or a user terminal 130.

The classical computer 110, the control device 121, and the user terminal 130 may, for example, be implemented by a computer 50, illustrated in FIG. 2. The computer 50 includes a CPU 51 serving as an example of a classical processor, memory 52 serving as a temporarily storage area, and a non-volatile storage section 53. The computer 50 further includes an input/output interface (I/F) 54 connected to an external device, an output device, or the like, and a read/write (R/W) section 55 that controls the reading and writing of data to a recording medium. The computer 50 further includes a network I/F 56 for connection to a network such as the internet. The CPU 51, the memory 52, the storage section 53, the input/output I/F 54, the R/W section 55, and the network I/F 56 are connected together through a bus 57.

The hybrid system 100 of the present exemplary embodiment computes a transition amplitude between given quantum states. Explanation follows regarding each of the assumptions employed in the present exemplary embodiment.

Transition Amplitude Evaluation

The hybrid system 100 of the present exemplary embodiment computes a transition amplitude $|\langle\psi_1|A|\psi_2\rangle|^2$ from a given quantum state $|\psi_1\rangle$ to another quantum state $|\psi_2\rangle$. Note that the quantum state $|\psi_1\rangle$ is an example of a first quantum state. The quantum state $|\psi_2\rangle$ is an example of a second quantum state. The quantum states are approximate energy eigenstates. Note that $\langle\psi_1|\psi_2\rangle=0$ is satisfied.

A is a physical quantity to be computed for the transition amplitude. In the present exemplary embodiment, A is an Hermitian operator, expressed by Equation (1) below.

$$A = \sum_i a_i P_i, \tag{1}$$

wherein $P_i$ and $a_i$ in Equation (1) satisfy the following Equations. Note that i is an index for identifying P and a. I, X, Y, and Z in the following Equation are Pauli operators.

$$P_i \in \{I,X,Y,Z\}^{\otimes n}$$

$$a_i \in \mathbb{R}$$

In the present exemplary embodiment, evaluation of overlap $|\langle\psi_1|\psi_2\rangle|^2$ is assumed to be possible for the two given quantum states $|\psi_1\rangle$, $|\psi_2\rangle$. Such evaluation may, for example, be performed using a known swap test (see for example Reference Document 1).

Reference Document 1: "Quantum Fingerprinting" by H. Buhrman, R. Cleve, J. Watrous, and R. deWolf in Phys. Rev. Lett. 87, 167902, 2001.

Note that an overlap can be evaluated from a prescribed relationship equation $|\langle\psi_1|\psi_2\rangle|^2 = |\langle 0|U_1^\dagger U_2|0\rangle|^2$ by finding a quantum circuit $U_1$ for generating the quantum state $|\psi_1\rangle$ and a quantum circuit $U_2$ for generating the quantum state $|\psi_2\rangle$. In the present exemplary embodiment, such evaluation is possible to compute the transition amplitude between quantum states obtainable by VQD.

A unitary gate is expressed by Equation (2) below. Note that P in Equation (2) below is a tensor product of a Pauli matrix.

$$U_{ij,\pm} = \frac{1}{\sqrt{2}}(I \pm iP_i)\frac{1}{\sqrt{2}}(I \pm iP_j), \tag{2}$$

$U_{ij,\pm}$ in Equation (2) may be expressed as a product of Pauli rotation gates as expressed by the following Equation.

$$U_{ij,\pm} = e^{\pm i\frac{\pi}{4}P_i} e^{\pm i\frac{\pi}{4}P_j}$$

Assuming $\langle\psi_1|\psi_2\rangle=0$, then Equation (3) below is satisfied.

$$|\langle\psi_1|A|\psi_2\rangle|^2 = \qquad (3)$$

$$\sum_i a_i^2 |\langle\psi_1|P_i|\psi_2\rangle|^2 + \sum_{i<j} a_i a_j [2|\langle\psi_1|U_{ij,+}|\psi_2\rangle|^2 + 2|\langle\psi_1|U_{ij,-}|\psi_2\rangle|^2 -$$

$$|\langle\psi_1|P_i|\psi_2\rangle|^2 - |\langle\psi_1|P_j|\psi_2\rangle|^2 - |\langle\psi_2|P_i P_j|\psi_2\rangle|^2],$$

As illustrated by Equation (3), the transition amplitude $|\langle\psi_1|A|\psi_2\rangle|^2$ on the left side can be expanded as shown on the right side. In Equation (3), $P_i$, $P_j$ are tensor products of a Pauli matrix, and $U_{ij,\pm}$ is a unitary gate. In Equation (3), $P_i|\psi\rangle$, $P_j|\psi\rangle$, $P_i P_j|\psi\rangle$, and $U_{ij,\pm}|\psi\rangle$ are quantum computations computable by a quantum computer. Accordingly, in a quantum computer, each of the elements in the terms on the right side of Equation (3) may be considered as a superposition of the quantum state $|\psi_1\rangle$ and the quantum state $|\psi_2\rangle$, enabling quantum measurement to be made.

The quantum computer 120 of the hybrid system 100 of the present exemplary embodiment executes quantum measurement on the elements in the terms on the right side of Equation (3), namely $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_i P_j|\psi_2\rangle$, and obtains measurement results for the quantum measurements. The classical computer 110 of the hybrid system 100 then computes the transition amplitude $|\langle\psi_1|A|\psi_2\rangle|^2$ according to Equation (3), based on the measurement results for $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_i P_j|\psi_2\rangle$ as obtained by the quantum computer 120. Note that the assumption $\langle\psi_1|\psi_2\rangle=0$ needs to be satisfied at all times in this case.

The transition amplitude computation can accordingly be performed by measuring the superposition between two quantum states as described above.

Operation of Hybrid System 100 of Present Exemplary Embodiment

Figure 3:
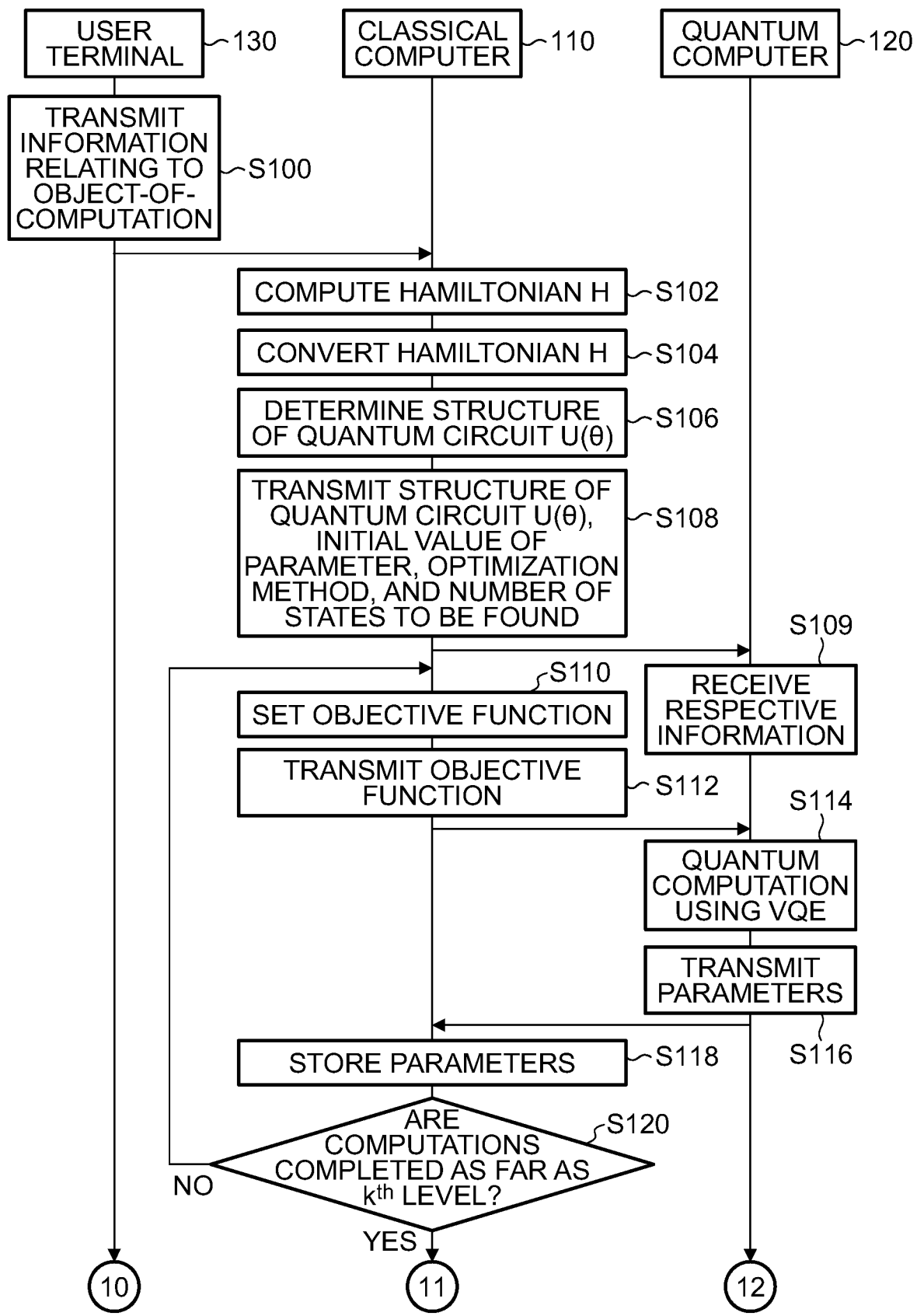
FIG. 3 is a diagram illustrating an example of computation processing of the hybrid system 100.

Next, explanation follows regarding specific operation of the hybrid system 100 of the present exemplary embodiment. The respective devices configuring the hybrid system 100 execute the various processing illustrated in FIG. 3 and FIG. 4.

First, at step S100, the user terminal 130 transmits information relating to an object-of-computation input by a user (hereafter referred to simply as "object-of-computation information") to the classical computer 110.

The object-of-computation information is information relating to a problem to be solved by quantum computation of the quantum computer 120, and includes, for example, information relating to the object-of-computation and information relating to a computation method. The information relating to the object-of-computation and the information relating to the computation method differ according to the object-of-computation.

Examples of the information relating to the object-of-computation include information relating to a molecular structure of an object-of-computation molecule, information relating to a physical quantity of the object-of-computation, and information relating to a number of quantum states (or eigenstates) to be computed. The physical quantity to be measured is represented by A in Equation (3), etc.

Examples of the information relating to the computation method include information relating to a conversion method for a Hamiltonian H, information relating to a variational wave function, information relating to an initial value of parameter θ of a quantum circuit U(θ), information relating to a reference wave function (for example, an HF state), information relating to an optimization method, and information relating to constraint conditions (for example particle numbers and spin).

Next, at step S102, the classical computer 110 receives the object-of-computation information transmitted from the user terminal 130 at step S100. At step S102, based on the received object-of-computation information (for example constraint conditions such as the numbers of particles and spin), the classical computer 110 computes a Hamiltonian H expressing energy states of a system according to a known computation formula. Interactions within the system are determined thereby.

At step S104, based on the received object-of-computation information (for example information relating to a conversion method for the Hamiltonian H), the classical computer 110 converts the Hamiltonian H computed at step S102 into a format that can be handled by the quantum computer 120 according to a known computation formula.

At step S106, the classical computer 110 determines the structure of the quantum circuit U(θ) based on the received object-of-computation information (for example information relating to a variational wave function). The structure of the quantum circuit U(θ) is determined using a known method according to VQD, described later.

At step S108, the classical computer 110 transmits, to the quantum computer 120, the structure of the quantum circuit U(θ) determined at step S106, the initial value of the parameter θ of the quantum circuit U(θ), the optimization method in the object-of-computation information received at step S102, and a number of states k to be found. A known method is employed as the optimization method.

At step S109, the control device 121 of the quantum computer 120 receives the structure of the quantum circuit U(θ), the initial value of the parameter θ, and the optimization method that were transmitted from the classical computer 110 at step S108.

At step S110, the classical computer 110 sets an objective function according to the Hamiltonian using VQD disclosed in Document 4 described above.

In cases in which the processing of step S110 is being performed for the first time, the classical computer 110 sets the objective function according to the Hamiltonian H obtained at step S104.

On the other hand, in cases in which the processing of step S110 is being performed for the second or subsequent time, the classical computer 110 computes a Hamiltonian $H_j$ corresponding to a $j^{th}$ excited state according to the following Equation and based on the Hamiltonian H obtained at step S104 and a ground state and $1^{st}$ to $j-1^{th}$ excited states obtained the previous time at step S110, and then sets the objective function according to $H_j$.

$$H_j := H + \sum_{i=0}^{j-1} \beta_i |\psi(\theta_i^*)\rangle\langle\psi(\theta_i^*)|.$$

$\{\beta_i\}$ in the above Equation is a sufficiently large set of positive real numbers. $\{|\psi(\theta^*_j)\rangle\}$ are approximate energy eigenstates from a $0^{th}$ to a j-$1^{th}$ level as obtained through optimization.

At step S112, the classical computer 110 transmits the objective function set at step S110 to the quantum computer 120.

At step S114, the control device 121 of the quantum computer 120 receives the objective function transmitted from the classical computer 110 at step S112. The control device 121 then causes the quantum computer 120 to execute a quantum computation employing VQE disclosed in Document 1 according to the structure of the quantum circuit $U(\theta)$, the initial value of the parameter $\theta$, and the optimization method as they were received at step S109.

Specifically, under control by the control device 121, the quantum computer 120 generates electromagnetic waves for irradiating at least one qubit out of the qubit cluster 123. The quantum computer 120 then generates the quantum state $|\psi(\theta)\rangle$ by irradiating the at least one qubit out of the qubit cluster 123 with the generated electromagnetic waves so as to execute the quantum circuit $U(\theta)$. This state is employed by the quantum computer 120 to evaluate the value of the objective function corresponding to the Hamiltonian $H_j$. The control device 121 sequentially updates the parameter $\theta$ so as to reduce the value of the objective function. The quantum computer 120 then re-evaluates the objective function. The above quantum circuit execution, objective function evaluation, and updating of the parameter $\theta$ are repeatedly performed, and optimization is determined to have been completed when the amount of change in value of the objective function falls below a reference value. The quantum computer 120 then outputs parameter $\theta_j^*$ of the quantum circuit $U(\theta)$.

At step S116, the control device 121 transmits the parameter $\theta_j^*$ of the quantum circuit $U(\theta)$ obtained at step S114 to the classical computer 110.

At step S118, the classical computer 110 receives the parameter $\theta_j^*$ of the quantum circuit $U(\theta)$ transmitted from the control device 121 at step S116. The classical computer 110 then stores the parameter $\theta_j^*$ of the quantum circuit $U(\theta)$ in a prescribed storage area.

At step S118, the classical computer 110 determines whether or not computation of the parameters corresponding to excited states has been completed as far as the $k^{th}$ level. Processing transitions to step S122 in FIG. 4 in cases in which computation has been completed for parameters $\theta_0^*, \ldots, \theta_k^*$ corresponding to excited states as far as the $k^{th}$ level. On the other hand, processing returns to step S110 in cases in which computation has not been completed of parameters $\theta_0^*, \ldots, \theta_k^*$ corresponding to excited states as far as the $k^{th}$ level, and the processing of step S110 to step S118 is repeated until computation has been completed for the parameters $\theta_0^*, \ldots, \theta_k^*$.

Note that the processing of step S110 to step S120 is the same processing as that of VQD disclosed in Document 4.

Figure 4:
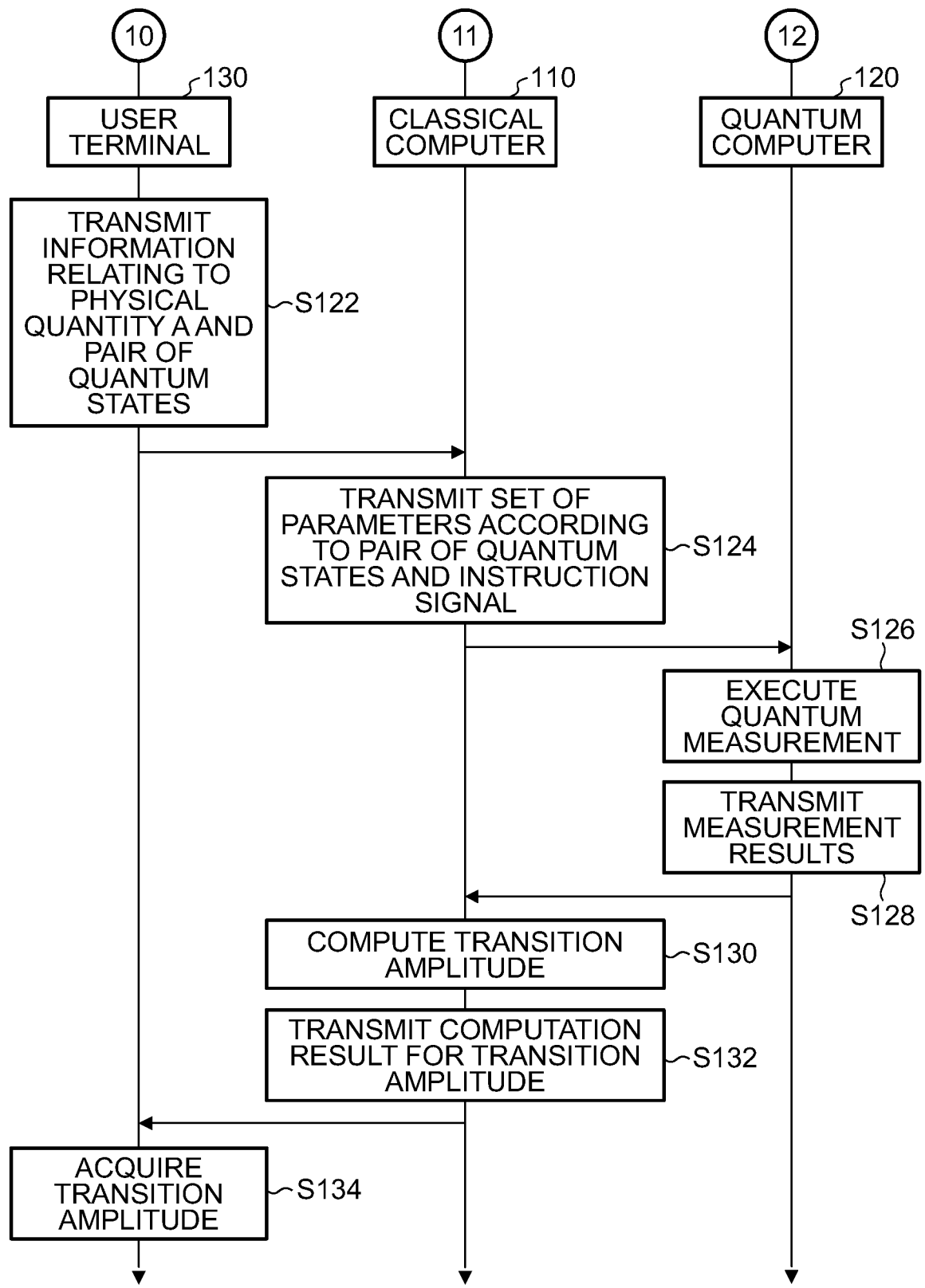
FIG. 4 is a diagram illustrating an example of computation processing of the hybrid system 100.

Next, the hybrid system 100 executes the processing illustrated in FIG. 4.

At step S122, the user terminal 130 transmits, to the classical computer 110, information relating to the physical quantity A for which the transition amplitude is to be computed, and information relating to $|\psi_1\rangle$, $|\psi_2\rangle$, these being the pair of quantum states for which the transition amplitude is to be computed.

At step S124, the classical computer 110 receives the information relating to the physical quantity A and the information relating to the quantum state pair of $|\psi_1\rangle$, $|\psi_2\rangle$ that were transmitted from the user terminal 130 at step S122. The classical computer 110 then sets a set of parameters corresponding to the quantum state pair $|\psi_1\rangle$, $|\psi_2\rangle$.

For example, in cases in which the quantum state $|\psi_1\rangle$ corresponds to a second level excited state and the quantum state $|\psi_2\rangle$ corresponds to a third level excited state, the classical computer 110 sets a set of a parameter $\theta_2^*$ corresponding to the second level and a parameter $\theta_3^*$ corresponding to the third level.

At step S124, the classical computer 110 transmits an instruction signal to the quantum computer 120 to instruct computation with the set of parameters that have been set.

At step S126, the quantum computer 120 receives the instruction signal and the set of parameters that were transmitted from the classical computer 110 at step S124.

At step S126, the quantum computer 120 executes quantum measurement of $\langle\psi_1|P_i|\psi_2\rangle$, $\langle\psi_1|U_{ij,+}|\psi_2\rangle$, $\langle\psi_1|P_j|\psi_2\rangle$, and $\langle\psi_1|P_iP_j|\psi_2\rangle$ in Equation (3) based on the set of parameters of the quantum circuit corresponding to the quantum state pair of the quantum state $\psi_1$ and the quantum state $\psi_2$. The quantum computer 120 then acquires measurement results of the quantum measurement.

At step S128, the quantum computer 120 transmits the measurement results obtained at step S126 to the classical computer 110.

At step S130, the classical computer 110 receives the measurement results transmitted from the quantum computer 120 at step S128. Based on the measurement results for $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$, the classical computer 110 then computes the transition amplitude $|\langle\psi_1|A|\psi_2\rangle|^2$ according Equation (3).

At step S132, the classical computer 110 transmits the computation result for the transition amplitude $|\langle\psi_1|A|\psi_2\rangle|^2$ obtained at step S130 to the user terminal 130.

At step S134, the user terminal 130 receives the computation result for the transition amplitude $|\langle\psi_1|A|\psi_2\rangle|^2$ that was transmitted from the classical computer 110 at step S132.

The user of the user terminal 130 executes various types of computation processing and the like using the computation result for the transition amplitude $|\langle\psi_1|A|\psi_2\rangle|^2$.

As described above, in the hybrid system of the present exemplary embodiment, the quantum computer executes quantum measurement of $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ in Equation (3) based on the quantum state pair of the first quantum state $\psi_1$ and the second quantum state $\psi_2$, and outputs the measurement results of the quantum measurement. The classical computer then computes the transition amplitude $|\langle\psi_1|A|\psi_2\rangle|^2$ according Equation (3) based on the measurement results obtained by the quantum measurement of the quantum computer, i.e. $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$. This thereby enables the transition amplitude to be computed with good accuracy.

The hybrid system of the present exemplary embodiment is thus capable of efficiently computing the transition amplitude by appropriate division of tasks between the classical computer and the quantum computer.

EXAMPLES

Explanation follows regarding Examples. In the present Examples, numerical simulation was performed using three algorithms, namely SSVQE, MCVQE, and VQD. Specifically, the three algorithms of SSVQE, MCVQE, and VQD are compared in accuracy and performance to obtain the excited states of given Hamiltonians.

In the present Examples, electron Hamiltonians of LiH, diazene, and azobenzine (AB) molecules were employed for comparison. LiH is considered a benchmark molecule in various research in quantum computation chemistry. Diazene and azobenzine (AB) are molecules relevant to industrial application of quantum chemistry.

Numerical Simulation

Figure 5:
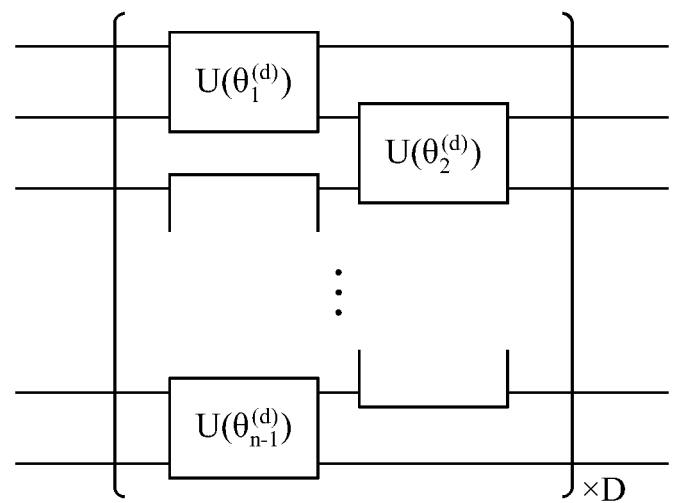
FIG. 5 is a diagram schematically illustrating an example of a quantum circuit employed in an Example.

Explanation follows regarding an outline of the numerical simulation employed in the present Examples. The present Examples employ a quantum circuit such as illustrated in FIG. 5. The quantum circuit in FIG. 5 is also referred to as a reflection symmetry-preserving (RSP) quantum circuit $U_{RSP}(\theta)$ in which the wave function components are limited to the real number values thereof. In FIG. 5, D represents the circuit depth. $R_y(\theta)$ in FIG. 5 is expressed by the following Equation.

$$R_y(\theta) = \exp(-i\theta Y/2)$$

The parameter $\theta$ of the quantum circuit $U_{RSP}(\theta)$ is the parameter to be optimized. A BFGS method, this being a known optimization method, is employed to optimize the parameter $\theta$. The electron Hamiltonians are computed using the Python-based simulations of chemistry framework (PySCF), which is an open-source quantum mechanics computation library.

In the numerical simulation, a spin singlet eigenstate and a spin triplet eigenstate in a low energy spectrum of an electron Hamiltonian are computed for molecules of each of LiH, diazene, and azobenzine (AB). Note that in order to avoid the need to compute every degenerate eigenstate of a spin triplet subspace, the original electron Hamiltonian H is corrected as shown in the Equation below. This enables computation to be omitted for states in the spin triplet having a non-zero z component of total electron spin.

$$H' = H + \alpha S_z^2,$$

In the above Equation, $S_z$ is an operator to express the z component of the total electron spin, and $\alpha$ is greater than zero. In the present Examples, a Hamiltonian H' with $\alpha$ set to 4 is employed. Note that Qulacs (https://github.com/qulacs) is employed for computation simulations for parts of processing allocated to the quantum computer.

LiH

The number of simulated qubits was 12 when performing a numerical simulation for the LiH molecule. An RSP quantum circuit as described above with D set to 10 is employed as the quantum circuit, and the total number of parameters is set to 110.

Three energy levels, namely S0, T1, and S1, are computed for 36 points of interatomic distance in LiH, and these then compared against computation results using a full configuration interaction method. A uniform random number in the range of [0, 2π] is employed as the initial value for the parameter of the quantum circuit at an initial point of a potential energy curve. Parameters optimized at adjacent points are employed as the initial value of the parameter for other points on the potential energy curve.

FIG. 6 illustrate energies of a LiH molecule as computed by SSVQE, MCVQE, and VQD, and deviations thereof. FCI in FIG. 6 indicates computation results using the full configuration interaction method and are the correct computation results. The lower graph in FIG. 6 is a graph illustrating deviations between the correct computation results using the full configuration interaction method and the computation results for SSVQE, MCVQE, and VQD. It is apparent that the computation results by VQD are more accurate than the computation results by SSVQE and MCVQE.

Diazene

For diazene, simulation is performed employing a molecular structure according to a minimum energy path (MEP) connecting the trans- and cis-isomers. For diazene, simulations of the present exemplary embodiment using SSVQE, MCVQE, and VQD are performed for the Hamiltonian, and the results thereof are compared against computation results using a complete active space configuration interaction (CASCI) method as the correct computation results. The number of qubits is 8. Note that the quantum circuit in FIG. 5 above is employed with the total number of parameters set to 140 and D=20. Again, uniform a random number generated over the range [0, 2π] is employed at the initial point on the MEP as the initial value for the parameter of the quantum circuit. Parameters optimized at adjacent points are employed as the initial value of the parameter for other points on the MEP.

In addition to the energy of each eigenstate, an oscillator strength $f_{ij}$ between spinlet states $|S_i\rangle$ and $|S_j\rangle$ is also computed. The oscillator strength $f_{ij}$ is defined as in the following Equation.

$$f_{ij} = \frac{2}{3}(E(S_j) - E(S_i)) \sum_{\alpha=x,y,z} |\langle S_j | R_\alpha | S_i \rangle|^2,$$

Note that E (S) is the energy of $|S\rangle$, and $R_\alpha$ is an electric dipole moment operator. The dipole moment operator $R_\alpha$ is expressed by the following Equation.

$$R_\alpha = \Sigma_{l=1}^{N} r_{l,\alpha}$$

Wherein in the above Equation, $r_{l,\alpha}$ is an $\alpha$ coordinate of a first electron. The oscillator strength is fundamental to research into photochemical dynamics and molecular reactions in quantum chemistry in order to apply normalized strengths to absorption and emission spectra of molecules. However, as illustrated in the above Equation, the transition amplitude of the $R_\alpha$ operator needs to be computed in order to compute this oscillator strength.

In the present Example a simulation is performed for computation of the oscillator strength using SSVQE, for computation of the oscillator strength using MCVQE, and for computation of the oscillator strength according to the present exemplary embodiment using VQD. The computation results thereof are then compared against computation results by a complete active space configuration interaction (CASCI) method.

Figure 7:
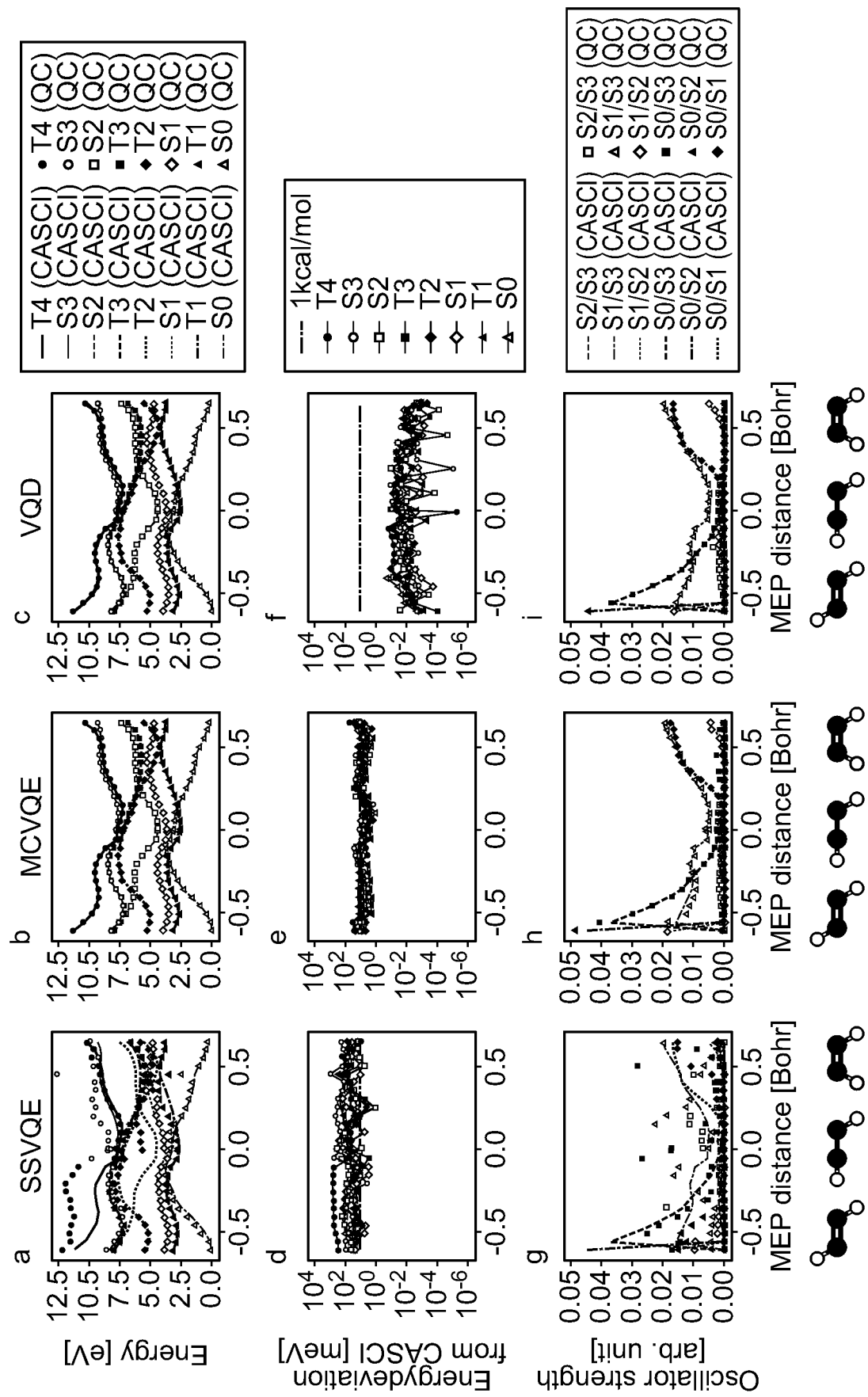
FIG. 7 is a diagram illustrating simulation results obtained by an Example.

FIG. 7 illustrates results of the respective computations. Graphs a to c of FIG. 7 illustrate the computation results for energy using the complete active space configuration interaction (CASCI) method and the computation results using each of the respective methods described above. Graphs d to f of FIG. 7 illustrate deviations between the computation results using the complete active space configuration interaction (CASCI) method as correct results and computation results using the respective methods described above. Graphs g to i of FIG. 7 illustrate computation results for the oscillator strength. It is apparent from graphs a to f of FIG. 7 that the method of the present exemplary embodiment using VQD obtains more accurate energy computation results than the other two methods. It can moreover be seen from graphs g to i of FIG. 7 that the method of the present exemplary embodiment using VQD enables the most accurate computation of oscillator strength.

Azobenzine (AB) Molecules

In the case of azobenzine (AB) molecules, simulation is performed employing two structures, namely those of a trans-isomer and a cis-isomer. The number of qubits is 6, and the total number of parameters of the quantum circuit is 50. The depth D of the quantum circuit is 10, and the quantum circuit of FIG. 5 is employed. A uniform random number in the range [0, 2π] is employed as the initial value of the quantum circuit parameter.

Figure 8:
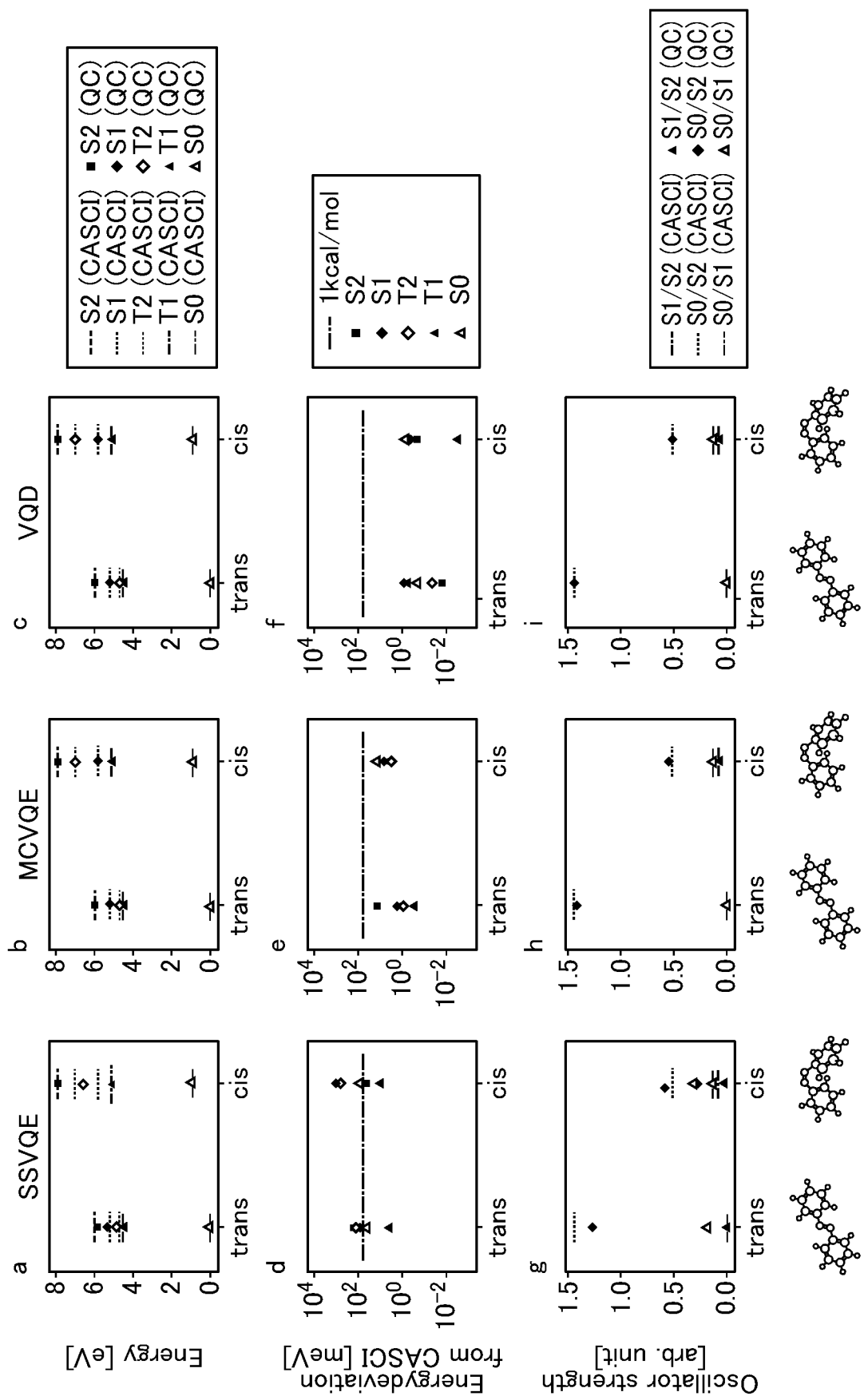
FIG. 8 is a diagram illustrating simulation results obtained by an Example.

FIG. 8 illustrates results of the respective computations. Graphs a to c of FIG. 8 illustrate the computation results for energy using the complete active space configuration interaction (CASCI) method and the computation results using each of the methods described above. Graphs d to f of FIG. 8 illustrate deviations in energies between the computation results using the complete active space configuration interaction (CASCI) method as correct results and computation results using each of the methods described above. Graphs g to i of FIG. 8 illustrate computation results for the oscillator strength. Similarly to in the case of diazene, it is apparent from graphs a to f of FIG. 8 that the method of the present exemplary embodiment using VQD obtains more accurate energy computation results than the other two methods. It is moreover apparent from graphs g to i of FIG. 8 that the method of the present exemplary embodiment using VQD enables the most accurate computation of oscillator strength.

Observations

As described above, the method of the present exemplary embodiment using VQD may be said to exhibit better performance than SSVQE and MCVQE. This is thought to be since VQD places less stringent demands on a quantum circuit than SSVQE and MCVQE. For SSVQE and MCVQE, a quantum circuit having optimal parameters needs to place all reference states simultaneously in a low energy subspace while employing common parameters for each state, whereas it is thought that for VQD optimization can be performed individually for each reference state using a quantum circuit having different parameters.

Note that the technology disclosed herein is not limited to the exemplary embodiments described above, and various modifications and applications are possible within a range not departing from the spirit of the present invention.

For example, in the exemplary embodiment described above, information may be exchanged in any manner between the classical computer 110 and the quantum computer 120. For example, the exchange of quantum circuit parameters, the exchange of measurement results, and the like between the classical computer 110 and the quantum computer 120 may be performed by successive exchanges performed each time a prescribed computation is completed, or may be performed by exchange after all computations have been completed.

Moreover, in the exemplary embodiment described above, explanation has been given regarding an example in which object-of-computation information is transmitted from the user terminal 130 to the classical computer 110, and the classical computer 110 executes computations according to the object-of-computation information. However, there is no limitation thereto. The user terminal 130 may transmit the object-of-computation information over a computer network such as an IP network to the classical computer 110 or to a storage medium or storage device accessible to the classical computer 110. Alternatively, the object-of-computation information may be stored on a storage medium or storage device and then passed to the administrator of the classical computer 110 for the administrator to input the object-of-computation information to the classical computer 110 using the storage medium or storage device.

In the exemplary embodiment described above, explanation has been given regarding an example of a case in which the quantum circuits are executed by irradiating electromagnetic waves. However, there is no limitation thereto, and quantum circuits may be executed using a different method.

Although explanation has been given regarding an example of a case in which the quantum computer 120 executes the quantum computation in the exemplary embodiment described above, there is no limitation thereto. For example, quantum computations may be executed by a classical computer that simulates the behavior of a quantum computer.

Although the exemplary embodiment described above assumes that the classical computer 110 and the quantum computer 120 are administered by separate organizations, the classical computer 110 and the quantum computer 120 may be administered as one by the same organization. In such cases, there is no longer a need to transmit quantum computation information from the classical computer 110 to the quantum computer 120, or to transmit measurement results from the quantum computer 120 to the classical computer 110. Moreover, in such cases the role of the classical computer 110 in the foregoing explanation may conceivably be performed by the control device 121 of the quantum computer 120.

Note that in the foregoing exemplary embodiment described in the present specification, unless the word "solely" is used, as in "based solely on xx", "according solely to xx", or "solely in the case of xx", this should be deemed to mean that consideration of other additional information may also be anticipated. For example, wording such as "in the case of A, then B" should be deemed not to mean that "B is always be true in the case of A", unless clearly stated as such.

Note that although the foregoing exemplary embodiment employs terms such as "optimize" and "optimized parameters", language relating to "optimization" refers to approaching an optimal state. Accordingly, when attempting to obtain parameters so as to minimize a function, the parameters obtained from optimizing the function are to be understood to not only be the parameters so as to achieve a global solution to minimizing the function but also to include cases in which a local solution to minimization is achieved.

Moreover, even if there is an aspect in which an operation different to the operations described in the present specification is performed in a method, program, terminal, device, server, or system (hereafter "method or the like"), the aspects of the technology disclosed herein concern operations the same as operations described in the present specification, and the additional presence of the operation different to the operations described in the present specification does not cause the method or the like to fall outside the scope of the aspects of the technology disclosed herein.

Although explanation has been given in the present application specification regarding exemplary embodiments in which a program is pre-installed, such a program may be provided stored on a computer-readable recording medium.

The configuration elements of the hybrid system of the present exemplary embodiment are not limited to implementation by a single computer or server, and they may be distributed between plural computers connected together over a network and implemented thereon.

For example, the processing executed by the classical computer in the respective exemplary embodiments described above may be distributed such that processing is performed by plural classical computers connected over a network. Alternatively, for example, the processing executed by the quantum computer in the respective exemplary embodiments described above may be distributed such that processing is performed between plural quantum computers connected over a network.

A second aspect of the present disclosure is a method of quantum information processing for computing a transition amplitude by processing executed by a classical computer. The processing includes computing a transition amplitude $|\langle\psi_1|A|\psi_2\rangle|^2$ according to Equation (1) below based on measurement results for $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ from quantum measurement executed by a quantum computer for a quantum state pair configured by a first quantum state xvi and a second quantum state $\psi_2$.

$$|\langle\psi_1|A|\psi_2\rangle|^2 = \sum_i a_i^2|\langle\psi_1|P_i|\psi_2\rangle|^2 + \sum_{i<j} a_i a_j [2|\langle\psi_1|U_{ij,+}|\psi_2\rangle|^2 + 2|\langle\psi_1|U_{ij,-}|\psi_2\rangle|^2 - |\langle\psi_1|P_i|\psi_2\rangle|^2 - |\langle\psi_1|P_j|\psi_2\rangle|^2 - |\langle\psi_1|P_iP_j|\psi_2\rangle|^2] \quad \text{Equation (1)}$$

Wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

A third aspect of the present disclosure is a method of quantum information processing for computing a transition amplitude by processing executed by a quantum computer. The processing includes executing quantum measurement of $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ of Equation (1) below based on a quantum state pair configured by a first quantum state $\psi_1$ and a second quantum state $\psi_2$, and outputting measurement results of the quantum measurement.

$$|\langle\psi_1|A|\psi_2\rangle|^2 = \sum_i a_i^2|\langle\psi_1|P_i|\psi_2\rangle|^2 + \sum_{i<j} a_i a_j [2|\langle\psi_1|U_{ij,+}|\psi_2\rangle|^2 + 2|\langle\psi_1|U_{ij,-}|\psi_2\rangle|^2 - |\langle\psi_1|P_i|\psi_2\rangle|^2 - |\langle\psi_1|P_j|\psi_2\rangle|^2 - |\langle\psi_1|P_iP_j|\psi_2\rangle|^2] \quad \text{Equation (1)}$$

Wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

A fourth aspect of the present disclosure is a classical computer configured to execute processing including computing a transition amplitude $|\langle\psi_1|A|\psi_2\rangle|^2$ according to Equation (1) below based on measurement results for $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ from quantum measurement executed by a quantum computer for a quantum state pair configured by a first quantum state $\psi_1$ and a second quantum state $\psi_2$.

$$|\langle\psi_1|A|\psi_2\rangle|^2 = \sum_i a_i^2|\langle\psi_1|P_i|\psi_2\rangle|^2 + \quad \text{Equation (1)}$$

-continued
$$\sum_{i<j} a_i a_j [2|\langle\psi_1|U_{ij,+}|\psi_2\rangle|^2 + 2|\langle\psi_1|U_{ij,-}|\psi_2\rangle|^2 - |\langle\psi_1|P_i|\psi_2\rangle|^2 - |\langle\psi_1|P_j|\psi_2\rangle|^2 - |\langle\psi_1|P_iP_j|\psi_2\rangle|^2]$$

Wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

A fifth aspect of the present disclosure is a quantum computer configured to execute processing including executing quantum measurement of $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ of Equation (1) below based on a quantum state pair configured by a first quantum state $\psi_1$ and a second quantum state $\psi_2$, and outputting measurement results of the quantum measurement.

$$|\langle\psi_1|A|\psi_2\rangle|^2 = \sum_i a_i^2|\langle\psi_1|P_i|\psi_2\rangle|^2 + \sum_{i<j} a_i a_j [2|\langle\psi_1|U_{ij,+}|\psi_2\rangle|^2 + 2|\langle\psi_1|U_{ij,-}|\psi_2\rangle|^2 - |\langle\psi_1|P_i|\psi_2\rangle|^2 - |\langle\psi_1|P_j|\psi_2\rangle|^2 - |\langle\psi_1|P_iP_j|\psi_2\rangle|^2] \quad \text{Equation (1)}$$

Wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

A sixth aspect of the present disclosure is a quantum information processing program that causes a classical computer to execute processing including computing a transition amplitude $|\langle\psi_1|A|\psi_2\rangle|^2$ according to Equation (1) below based on measurement results for $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ from quantum measurement executed by a quantum computer for a quantum state pair configured by a first quantum state $\psi_1$ and a second quantum state $\psi_2$ $$|\langle\psi_1|A|\psi_2\rangle|^2 = \sum_i a_i^2|\langle\psi_1|P_i|\psi_2\rangle|^2 + \sum_{i<j} a_i a_j [2|\langle\psi_1|U_{ij,+}|\psi_2\rangle|^2 + 2|\langle\psi_1|U_{ij,-}|\psi_2\rangle|^2 - |\langle\psi_1|P_i|\psi_2\rangle|^2 - |\langle\psi_1|P_j|\psi_2\rangle|^2 - |\langle\psi_1|P_iP_j|\psi_2\rangle|^2] \quad \text{Equation (1)}$$

Wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

A seventh aspect of the present disclosure is a quantum information processing program that causes a quantum computer to execute processing including executing quantum measurement of $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ of Equation (1) below based on a quantum state pair configured by a first quantum state $\psi_1$ and a second quantum state $\psi_2$, and outputting measurement results of the quantum measurement.

$$|\langle\psi_1|A|\psi_2\rangle|^2 = \sum_i a_i^2|\langle\psi_1|P_i|\psi_2\rangle|^2 + \quad \text{Equation (1)}$$

$$\sum_{i<j} a_i a_j [2|\langle\psi_1|U_{ij,+}|\psi_2\rangle|^2 + 2|\langle\psi_1|U_{ij,-}|\psi_2\rangle|^2 -$$

$$|\langle\psi_1|P_i|\psi_2\rangle|^2 - |\langle\psi_1|P_j|\psi_2\rangle|^2 - |\langle\psi_1|P_iP_j|\psi_2\rangle|^2]$$

Wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

Often a transition amplitude from one eigenstate to another eigenstate is needed to predict various response quantities, such as light absorption and light emission in photochemistry. In the case of related technology, among the excited state computation methods described above, SSVQE and MCVQE have the advantage of enabling easy computation of a transition amplitude for a computed excited state. However, there is room for improvement in terms of the accuracy thereof. A method for computing a transition amplitude using VQD is, however, hitherto unknown.

In consideration of the above circumstances, technology disclosed herein provides a quantum information processing method, a classical computer, a quantum computer, a hybrid system, and a quantum information processing program that are capable of computing a transition amplitude with good accuracy.

The technology disclosed herein obtains the advantageous effect of enabling a transition amplitude to be computed with good accuracy.

The disclosure of Japanese Patent Application No. 2020-132647, filed on Aug. 4, 2020, is incorporated in its entirety by reference herein. All cited documents, patent applications, and technical standards mentioned in the present specification are incorporated by reference in the present specification to the same extent as if each individual cited document, patent application, or technical standard was specifically and individually indicated to be incorporated by reference.

What is claimed is:

1. A quantum information processing method for computing a transition amplitude by processing executed on a hybrid system including a classical computer and a quantum computer, the processing comprising:

the quantum computer executing quantum measurement based on a quantum state pair configured by a first quantum state $\psi_1$ and a second quantum state $\psi_2$ so as to measure $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ in Equation (1) below, and outputting measurement results from the quantum measurement; and the classical computer computing a transition amplitude $|\langle\psi_1|A|\psi_2\rangle|^2$ according to Equation (1) below, based on the measurement results for $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ $$|\langle\psi_1|A|\psi_2\rangle|^2 = \sum_i a_i^2 |\langle\psi_1|P_i|\psi_2\rangle|^2 + \qquad \text{Equation (1)}$$

$$\sum_{i<j} a_i a_j [2|\langle\psi_1|U_{ij,+}|\psi_2\rangle|^2 + 2|\langle\psi_1|U_{ij,-}|\psi_2\rangle|^2 -$$

$$|\langle\psi_1|P_i|\psi_2\rangle|^2 - |\langle\psi_1|P_j|\psi_2\rangle|^2 - |\langle\psi_1|P_iP_j|\psi_2\rangle|^2]$$

wherein A is a physical quantity for computation of transition amplitude, i and j are indices for identifying a and P, a is a real number, P is a tensor product of a Pauli matrix, U is a unitary gate, and $\langle\psi 1|\psi 2\rangle=0$.

2. The quantum information processing method for computing a transition amplitude of claim 1, wherein the quantum computer executes the quantum measurement based on a set of parameters θ for a quantum circuit corresponding to the quantum state pair of the first quantum state $\psi_1$ and the second quantum state $\psi_2$, obtained by computation employing variational quantum deflation.

3. The quantum information processing method for computing a transition amplitude of claim 1, wherein:

the classical computer and the quantum computer are connected to each other over a computer network; and the classical computer and the quantum computer exchange information with each other over the computer network.

4. A method of quantum information processing for computing a transition amplitude by processing executed by a classical processor of a classical computer including a memory and the classical processor coupled to the memory, the processing comprising:

computing a transition amplitude $|\langle\psi_1|A|\psi_2\rangle|^2$ according to Equation (1) below based on measurement results for $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ from quantum measurement executed by a quantum computer for a quantum state pair configured by a first quantum state $\psi_1$ and a second quantum state $\psi_2$ $$|\langle\psi_1|A|\psi_2\rangle|^2 = \sum_i a_i^2 |\langle\psi_1|P_i|\psi_2\rangle|^2 + \qquad \text{Equation (1)}$$

$$\sum_{i<j} a_i a_j [2|\langle\psi_1|U_{ij,+}|\psi_2\rangle|^2 + 2|\langle\psi_1|U_{ij,-}|\psi_2\rangle|^2 -$$

$$|\langle\psi_1|P_i|\psi_2\rangle|^2 - |\langle\psi_1|P_j|\psi_2\rangle|^2 - |\langle\psi_1|P_iP_j|\psi_2\rangle|^2]$$

wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

5. A method of quantum information processing for computing a transition amplitude by processing executed by a quantum processor of a quantum computer including the quantum processor, the processing comprising:

executing quantum measurement of $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ of Equation (1) below based on a quantum state pair configured by a first quantum state $\psi_1$ and a second quantum state $\psi_2$, and outputting measurement results of the quantum measurement $$|\langle\psi_1|A|\psi_2\rangle|^2 = \sum_i a_i^2 |\langle\psi_1|P_i|\psi_2\rangle|^2 + \qquad \text{Equation (1)}$$

$$\sum_{i<j} a_i a_j [2|\langle\psi_1|U_{ij,+}|\psi_2\rangle|^2 + 2|\langle\psi_1|U_{ij,-}|\psi_2\rangle|^2 -$$

$$|\langle\psi_1|P_i|\psi_2\rangle|^2 - |\langle\psi_1|P_j|\psi_2\rangle|^2 - |\langle\psi_1|P_iP_j|\psi_2\rangle|^2]$$

wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

6. A classical computer including a memory and a classical processor coupled to the memory, the classical processor executing processing comprising:

computing a transition amplitude $|\langle\psi_1|A|\psi_2\rangle|^2$ according to Equation (1) below based on measurement results for $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ from quantum measurement executed by a quantum computer for a quantum state pair configured by a first quantum state xvi and a second quantum state $\psi_2$ $$|\langle\psi_1|A|\psi_2\rangle|^2 = \sum_i a_i^2|\langle\psi_1|P_i|\psi_2\rangle|^2 +$$
$$\sum_{i<j} a_i a_j [2|\langle\psi_1|U_{ij,+}|\psi_2\rangle|^2 + 2|\langle\psi_1|U_{ij,-}|\psi_2\rangle|^2 -$$
$$|\langle\psi_1|P_i|\psi_2\rangle|^2 - |\langle\psi_1|P_j|\psi_2\rangle|^2 - |\langle\psi_1|P_iP_j|\psi_2\rangle|^2]$$

Equation (1)

wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

7. A quantum computer including a quantum processor, the quantum processor executing processing comprising:

executing quantum measurement of $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ of Equation (1) below based on a quantum state pair configured by a first quantum state $\psi_1$ and a second quantum state $\psi_2$, and outputting measurement results of the quantum measurement $$|\langle\psi_1|A|\psi_2\rangle|^2 = \sum_i a_i^2|\langle\psi_1|P_i|\psi_2\rangle|^2 +$$
$$\sum_{i<j} a_i a_j [2|\langle\psi_1|U_{ij,+}|\psi_2\rangle|^2 + 2|\langle\psi_1|U_{ij,-}|\psi_2\rangle|^2 -$$
$$|\langle\psi_1|P_i|\psi_2\rangle|^2 - |\langle\psi_1|P_j|\psi_2\rangle|^2 - |\langle\psi_1|P_iP_j|\psi_2\rangle|^2]$$

Equation (1)

wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

8. A hybrid system including the quantum computer of claim 7 and a classical computer including a memory and a classical processor coupled to the memory, the classical processor executing processing comprising:

computing a transition amplitude $|\langle\psi_1|A|\psi_2\rangle|^2$ according to Equation (1) below based on measurement results for $\langle\psi_1|P_i|\psi_2\rangle$, $\langle\psi_1|U_{ij,+}|\psi_2\rangle$, $\langle\psi_1|P_j|\psi_2\rangle$, and $\langle\psi_1|P_iP_j|\psi_2\rangle$ from quantum measurement executed by a quantum computer for a quantum state pair configured by a first quantum state $\psi_1$ and a second quantum state $\psi_2$ $$|\langle\psi_1|A|\psi_2\rangle|^2 = \sum_i a_i^2|\langle\psi_1|P_i|\psi_2\rangle|^2 +$$

Equation (1)

$$\sum_{i<j} a_i a_j [2|\langle\psi_1|U_{ij,+}|\psi_2\rangle|^2 + 2|\langle\psi_1|U_{ij,-}|\psi_2\rangle|^2 -$$
$$|\langle\psi_1|P_i|\psi_2\rangle|^2 - |\langle\psi_1|P_j|\psi_2\rangle|^2 - |\langle\psi_1|P_iP_j|\psi_2\rangle|^2]$$

wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

9. A non-transitory recording medium storing a quantum information processing program executable by a classical processor to perform processing comprising:

computing a transition amplitude $|\langle\psi_1|A|\psi_2\rangle|^2$ according to Equation (1) below based on measurement results for $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ from quantum measurement executed by a quantum computer for a quantum state pair configured by a first quantum state $\psi_1$ and a second quantum state $\psi_2$ $$|\langle\psi_1|A|\psi_2\rangle|^2 = \sum_i a_i^2|\langle\psi_1|P_i|\psi_2\rangle|^2 +$$
$$\sum_{i<j} a_i a_j [2|\langle\psi_1|U_{ij,+}|\psi_2\rangle|^2 + 2|\langle\psi_1|U_{ij,-}|\psi_2\rangle|^2 -$$
$$|\langle\psi_1|P_i|\psi_2\rangle|^2 - |\langle\psi_1|P_j|\psi_2\rangle|^2 - |\langle\psi_1|P_iP_j|\psi_2\rangle|^2]$$

Equation (1)

wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

10. A non-transitory recording medium storing a quantum information processing program executable by a quantum processor to perform processing comprising:

executing quantum measurement of $\langle\psi_1|P_i|\psi_2\rangle$, $\langle\psi_1|U_{ij,+}|\psi_2\rangle$, $\langle\psi_1|U_{ij,-}|\psi_2\rangle$, $\langle\psi_1|P_j|\psi_2\rangle$, and $\langle\psi_1|P_iP_j|\psi_2\rangle$ of Equation (1) below based on a quantum state pair configured by a first quantum state $\psi_1$ and a second quantum state $\psi_2$, and outputting measurement results of the quantum measurement $$|\langle\psi_1|A|\psi_2\rangle|^2 = \sum_i a_i^2|\langle\psi_1|P_i|\psi_2\rangle|^2 +$$
$$\sum_{i<j} a_i a_j [2|\langle\psi_1|U_{ij,+}|\psi_2\rangle|^2 + 2|\langle\psi_1|U_{ij,-}|\psi_2\rangle|^2 -$$
$$|\langle\psi_1|P_i|\psi_2\rangle|^2 - |\langle\psi_1|P_j|\psi_2\rangle|^2 - |\langle\psi_1|P_iP_j|\psi_2\rangle|^2]$$

Equation (1)

wherein A is a physical quantity for computation of transition amplitude, i and j are indices for identifying a and P, a is a real number, P is a tensor product of a Pauli matrix, U is a unitary gate, and $\langle\psi_1|\psi_2\rangle=0$.

* * * * *

UNITED STATES PATENT AND TRADEMARK OFFICE
CERTIFICATE OF CORRECTION

| | | |
|---|---|---|
| PATENT NO. | : 11,900,213 B2 | Page 1 of 1 |
| APPLICATION NO. | : 17/392677 | |
| DATED | : February 13, 2024 | |
| INVENTOR(S) | : Yohei Ibe et al. | |

It is certified that error appears in the above-identified patent and that said Letters Patent is hereby corrected as shown below:

In the Claims

Column 17, Line 9, Claim 6:
After "configured by a first quantum state"
Delete "xvi" and
Insert -- $\psi_1$ --.

Signed and Sealed this
Twenty-fourth Day of September, 2024

Katherine Kelly Vidal
*Director of the United States Patent and Trademark Office*